United States Patent [19]
Niederman et al.

[11] Patent Number: 5,794,974
[45] Date of Patent: Aug. 18, 1998

[54] INFLATABLE RESTRAINT CUSHION

[75] Inventors: Robert Raymond Niederman, Dayton; James Lloyd Webber, Centerville, both of Ohio

[73] Assignee: General Motors Corporation, Detroit, Mich.

[21] Appl. No.: 755,192

[22] Filed: Nov. 25, 1996

[51] Int. Cl.$^6$ .................................................. B60R 21/16
[52] U.S. Cl. ........................... 280/743.1; 280/728.1
[58] Field of Search ..................... 280/743.1, 728.1, 280/729, 730.1, 731, 743.2

[56] References Cited

U.S. PATENT DOCUMENTS 5,482,317  1/1996  Nelsen et al. ..................... 280/743.1

FOREIGN PATENT DOCUMENTS 5077342  3/1993  Japan ..................... 280/743.1
6-239191  8/1994  Japan ..................... 280/743.1

OTHER PUBLICATIONS

U.S. Patent Application Serial No. 08/626,855, filed Apr. 3, 1996, by Niederman et al.

*Primary Examiner*—Peter C. English
*Attorney, Agent, or Firm*—Kathryn A. Marra

[57] ABSTRACT

A restraint cushion includes a generally quadrangular sheet of material having a central portion and four corner portions extending from the central portion. Each corner portion has a fold line adjacent the central portion and two free edges extending from the fold line and intersecting each other to form a point. A mounting portion extends from one of the corner portions. The mounting portion has a cushion opening therein for receiving inflator gas therethrough to inflate the air bag. The mounting portion has outer edges which are spaced apart from the cushion opening. The corner portions are folded about the fold lines in overlying relationship to the central portion and in mating relationship to corresponding outer edges of the mounting portions. Each of the corner portions has one of the free edges joined to one of the outer edges of the mounting portion and each of the free edges is spaced apart from the cushion opening. Thus, the mounting portion and cushion opening are not disrupted by the mating edges forming the cushion.

15 Claims, 3 Drawing Sheets

INFLATABLE RESTRAINT CUSHION

TECHNICAL FIELD

This invention relates to an inflatable restraint cushion for use in a vehicle.

BACKGROUND OF THE INVENTION

It is well known in motor vehicles to provide a supplemental inflatable restraint system for protection of a vehicle occupant. The restraint system includes an inflatable restraint cushion which includes a cushion opening through which inflator gas is received. The cushion is rapidly inflated by discharging gas from an inflator when the vehicle experiences certain predetermined conditions.

Restraint cushions are typically comprised of two or more fabric panels sewn together along mating edges. For example, the prior art discloses a typical driver's side restraint cushion including two round fabric panels sewn together at the circumferential mating edges. These restraint cushions are preferably made from a heavy fabric with a high denier to withstand the stress placed on the seams of the cushion during inflation.

It is also known in the prior art to provide a generally square cushion which has a plurality of flaps folded in towards the center to provide the cushion opening at the junction at which the flaps are joined. This cushion has the shortcoming of having numerous overlapping edges or layers of material intersecting at the cushion opening and being in the location for mounting the air bag. These relatively thick overlapping edges or layers of material which intersect numerous locations near the cushion opening of the air bag can make it difficult to mount the air bag. In addition, the mounting portion of the cushion is not formed until after the cushion is constructed and any corresponding reinforcements or heat shields desired on the mounting portion must be attached after the rest of the cushion is constructed, making attachment of the reinforcements more difficult.

SUMMARY OF THE INVENTION

This invention provides an improved restraint cushion that enables construction with lighter materials, as well as traditional heavier materials. Advantageously, the edges of the sheet forming the cushion are placed such that they are subject to lower stress during inflation. The cushion is mainly formed from a generally quadrangular piece of material and is easy to construct due to the location at which the edges are joined to each other. Also advantageously, the mounting portion of the air bag is preferably added into the shape of the cushion. This enables easier construction of the cushion without any of the overlapping edges disrupting the mounting portion. This also permits easier access to the mounting portion for providing a cushion opening for receiving inflator gas therethrough and for adding reinforcements or heat shields prior to forming the cushion since the mounting portion exists prior to full assembly of the cushion. Another advantage is that efficient material utilization is achieved since the cushion is formed mainly from a generally quadrangular piece of material, as opposed to odd-shaped or multiple pieces of material used in prior art cushions. Another advantage is that the cushion, preferably made of the lighter material, provides a lightweight and more compact cushion requiring less space for packaging when in a folded condition.

These advantages are accomplished in the present invention by preferably providing a restraint cushion for receiving inflator gas discharged from an inflator. The restraint cushion includes a generally quadrangular sheet of material having a central portion and four corner portions extending from the central portion. Each corner portion has a fold line adjacent the central portion and two free edges extending from the fold line and intersecting each other to form a point. A mounting portion extends from one of the corner portions. The mounting portion has a cushion opening therein for receiving inflator gas therethrough to inflate the cushion. The mounting portion has outer edges which are spaced apart from the cushion opening. The corner portions are folded about the fold lines in overlying relationship to the central portion and in mating relationship to corresponding outer edges of the mounting portion. Each of the corner portions has one of the free edges joined to one of the outer edges of the mounting portion and each of the free edges is spaced apart from the cushion opening. Thus, the mounting portion and cushion opening are not disrupted by the mating edges forming the cushion.

Preferably, the sheet is generally in the shape of a square, the central portion is generally in the shape of a square, and the corner portions are generally triangular. The generally triangular corner portions preferably define first, second, and third angles with one of the angles being a right angle and the other two of the angles being unequal to each other. Preferably, the first angle is about 90 degrees, the second angle is about 60 degrees, and the third angle is about 30 degrees. Also preferably, each of the corner portions has an asymmetrical shape.

In accordance with another preferred aspect of the invention, a method of making a generally quadrangular restraint cushion includes the steps of providing a generally quadrangular sheet of material having a central portion and four corner portions extending from the central portion, each corner portion having a fold line adjacent the central portion and each corner portion having two free edges extending from the fold line and intersecting each other to form a point; providing a mounting portion attached to one of the corner portions prior to folding the corner portions; folding the corner portions about the fold lines in overlying relationship to the central portion and in mating relationship to the mounting portion, and joining one of the free edges of each corner portion to the mounting portion and joining the corresponding mating free edges of the corner portions to each other.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1:
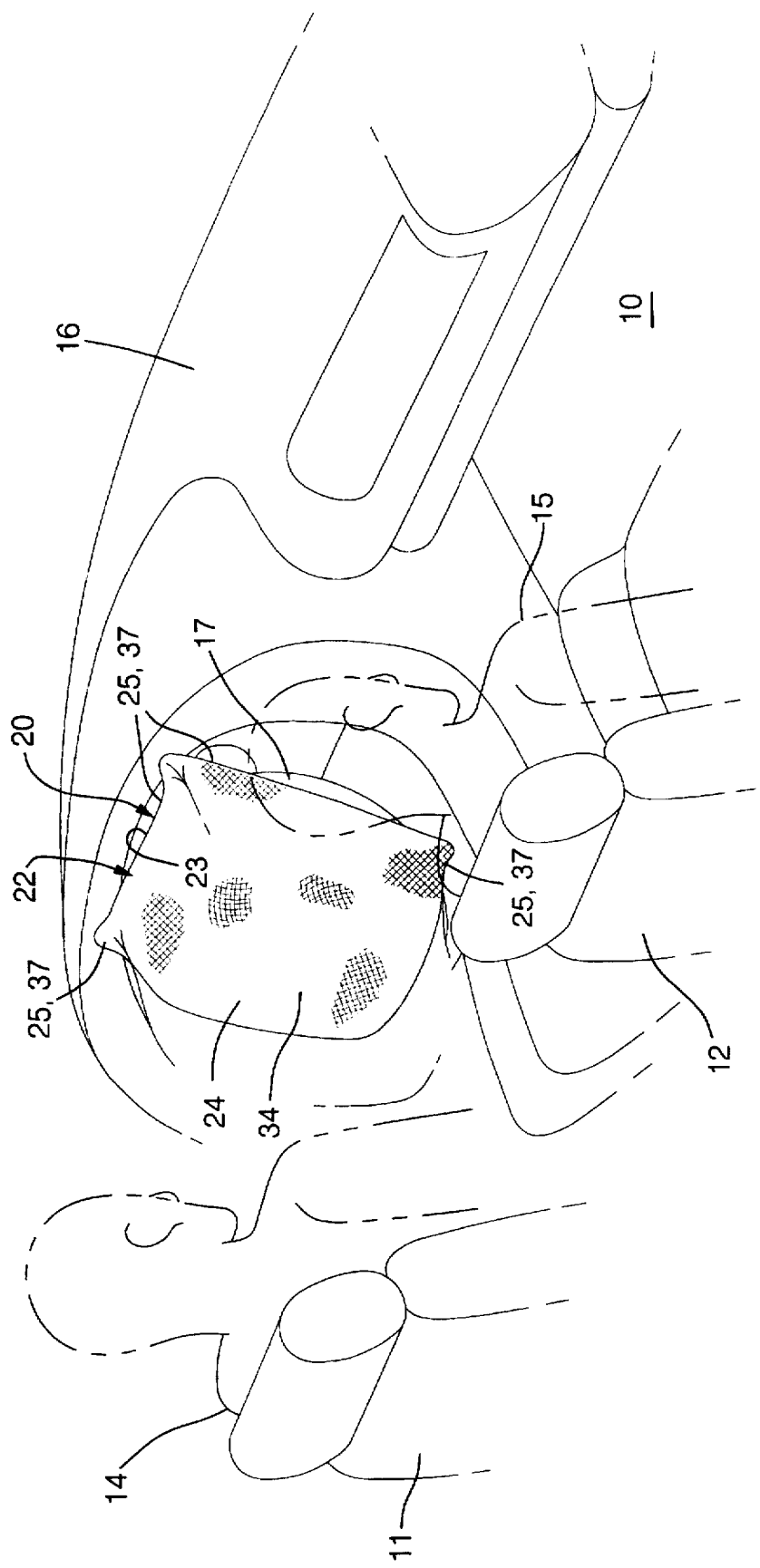
FIG. 1 is a perspective view of a vehicle interior and showing an inflatable restraint cushion according to the present invention in the inflated condition.

Referring to FIG. 1, a vehicle interior 10 includes a driver's side seat 11 and a passenger's side seat 12. A driver's side occupant 14 is seated in the driver's side seat 11 and a passenger's side occupant 15 is seated in the passenger's side seat 12. An instrument panel 16 extends across the interior 10 forward of the occupants 14, 15. A steering wheel 17 is located forward of the driver's side occupant 14 and includes a supplemental inflatable restraint system 20 mounted thereon.

An inflatable restraint cushion 22 of the restraint system 20 is shown in the deployed condition in FIG. 1. The cushion 22 has a generally rectangular shape and includes a forward wall 23, an opposite rearward wall 24, and four side edges 25 interconnecting the forward and rearward walls 23, 24. The rearward wall 24 of the cushion 22 opposes the driver's side occupant 14 for restraint when the cushion 22 is in the inflated condition as shown in FIG. 1. Although the cushion 22 is preferably shown in a restraint system 20 mounted on the steering wheel 17, it will be appreciated that the cushion 22 could also be used in restraint systems located in other vehicle locations.

Figure 3:
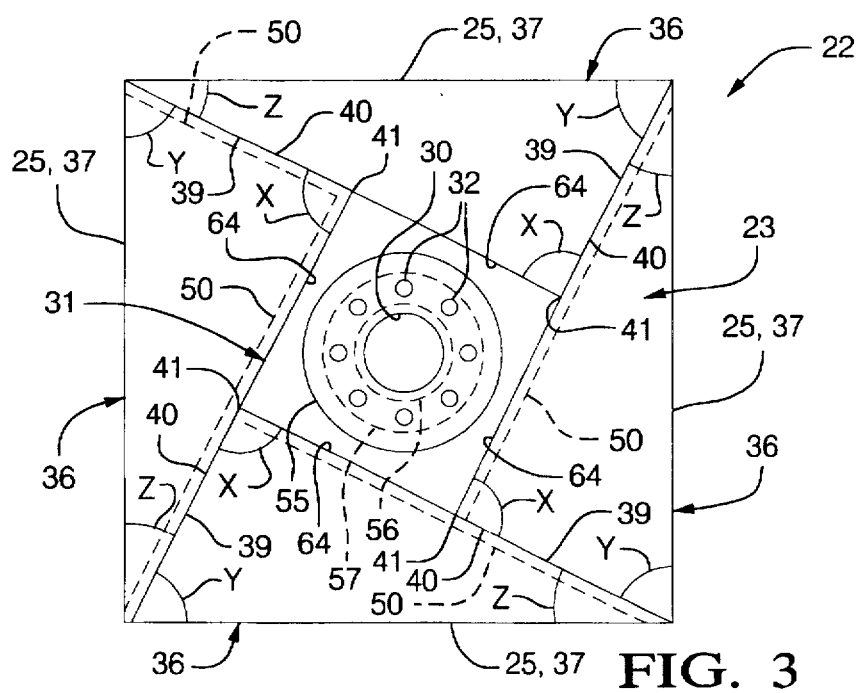
FIG. 3 is a plan view showing a forward wall of the cushion in the assembled condition.

As best shown in FIG. 3, the forward wall 23 of the cushion 22 includes a cushion opening 30 for receiving discharging gas from an inflator (not shown) of the restraint system 20 to inflate the cushion 22. The inflator is preferably mounted on the steering wheel 17 and discharges gas upon sensing certain predetermined vehicle conditions to inflate the cushion 22. Preferably, the cushion opening 30 on the forward wall 23 is generally centered on the forward wall 23 of the cushion 22 in the assembled condition as best shown in FIG. 3. The cushion opening 30 is located on a mounting portion 31 of the cushion 22 which preferably secures the cushion 22 to the restraint system 20 in a conventional manner, such as by fasteners (not shown) extending through spaced apart fastener apertures 32 located around the cushion opening 30, as described further hereinafter.

FIG. 1 shows the cushion 22 in the fully inflated condition. However, it will be appreciated that the cushion 22 is normally stored in a folded condition within the restraint system 20. The cushion 22 may be made of any suitable material for cushion construction including a conventional heavy silicone-coated fabric material, for example having a denier of about 420 and about 46 ends per inch and about 46 picks per inch and a weight of about 6.3 ounces per square yard. However, the cushion 22 is preferably made of a lighter fabric material having a denier of about 70 and having about 200 ends per inch and about 130 picks per inch with a fabric weight of about 3.7 ounces per square yard, as enabled by the unique shape and construction of the cushion 22, described in detail hereinafter. Advantageously, the cushion 22 made of the lighter fabric material is lightweight and folds into a smaller compact package than prior art cushions. However, it will be appreciated that the cushion 22 may be made of a variety of materials suitable for cushion construction and is not limited to the examples listed.

Figure 2:
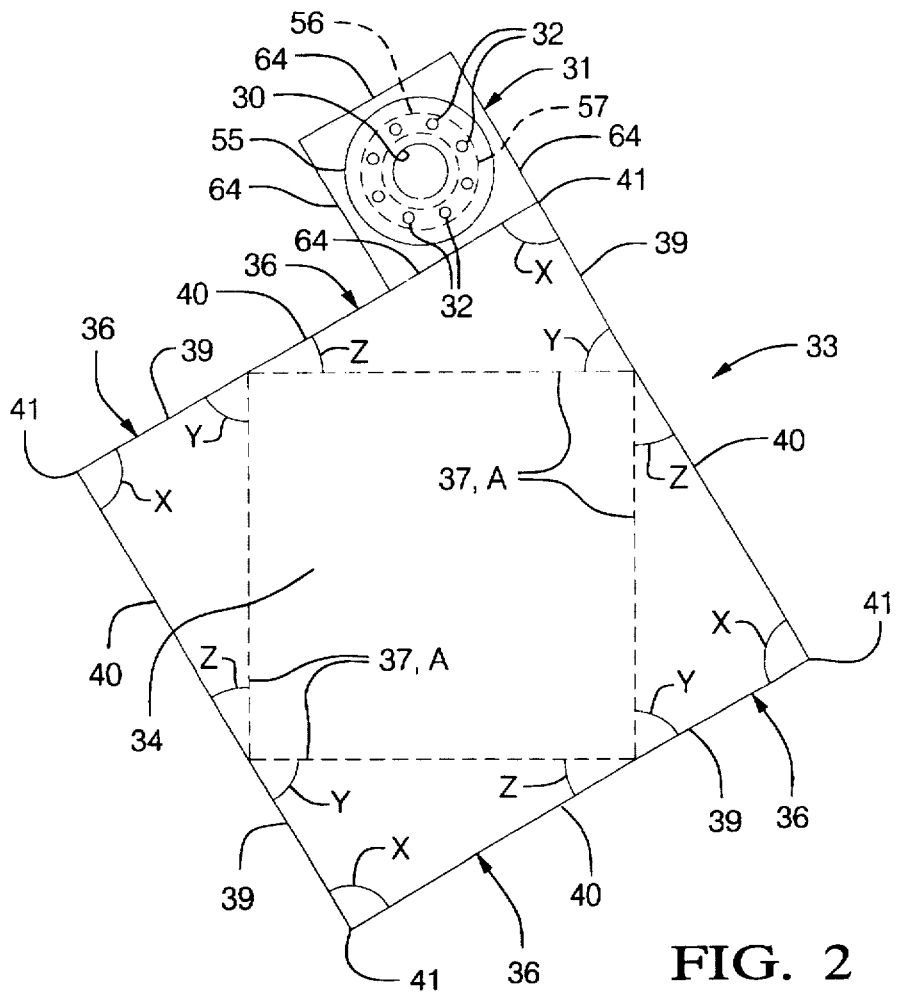
FIG. 2 is a plan view of a sheet of material forming the cushion prior to being folded with the location of the fold lines indicated.

Referring to FIG. 2, the cushion 22 is formed from a generally quadrangular sheet 33 of cushion material. The sheet 33 preferably has a generally square shape. The sheet 33 includes a central portion 34 which also preferably has a generally square shape. It will be appreciated that the central portion 34 also provides the rearward wall 24 of the cushion 22 for engaging the occupant 14 when the cushion 22 is deployed. The sheet 33 further includes four corner portions 36 which extend outward from the central portion 34. The corner portions 36 each preferably have a generally triangular shape. The sheet 33 is preferably one continuous integral sheet of material with the central portion 34 and the corner portions 36 being integral.

Each of the corner portions 36 includes a fold edge 37 which is connected to the central portion 34 preferably along the entire length of the fold edge 37. Each of the fold edges 37 corresponds to a fold line A adjacent the central portion 34 and about which the corner portions 36 are folded to construct the cushion 22, as described further hereinafter. Each of the corner portions 36 further includes first and second free edges 39, 40, respectively, with the free edges 39, 40 each extending outward from opposing sides of the fold edge 37. The free edges 39, 40 on each of the corner portions 36 intersect each other to form a point 41.

The corner portions 36 are each defined by first, second and third angles X, Y, Z, respectively, as best shown in FIG. 2. The first angles X are defined between the first and second free edges 39, 40 and are preferably about a 90 degree right angle. The second angles Y of the corner portions 36 are defined between the first free edges 39 and the fold edges 37 and are preferably about a 60 degree angle. The third angles Z of the corner portions 36 are defined between the second free edges 40 and the fold edges 37 and are preferably about a 30 degree angle. Thus, it will be appreciated that the second and third angles Y, Z are preferably unequal to each other. In addition, each of the corner portions 36 preferably has an asymmetrical shape. Advantageously, the corner portions 36 having unequal second and third angles Y, Z being about 60 degrees and about 30 degrees, respectively, enable the cushion 22 to be easily constructed without numerous thick overlapping edges or layers of material across the mounting portion 31 of the cushion 22, as described further hereinafter.

The cushion 22 further includes the mounting portion 31 for mounting the cushion 22 to the restraint system 20. The mounting portion 31 also includes the cushion opening 30 extending therethrough and generally centered thereon for receiving inflator gas therethrough during cushion inflation. The mounting portion 31 preferably has a generally square shape and includes four outer edges 64, one of which is congruent with the free edge 40 of one of the corner portions 36. The mounting portion 31 preferably extends from only one of the corner portions 36. As best shown in FIG. 2, the mounting portion 31 extends from the corner portion 36 and is integrally formed as part of the generally quadrangular sheet 33. Thus, it will be appreciated that the generally quadrangular shape of the sheet 33 may preferably include the mounting portion 31 integrally formed therewith. Thus, one of the outer edges 64 of the mounting portion 31 is integrally formed with one of the free edges 39, 40 of the corner portions 36. It will further be appreciated that the sheet 33 including the central portion 34, the corner portions 36, and the mounting portion 31 is preferably integrally formed as a single integral sheet 33 of fabric material.

Figure 4:
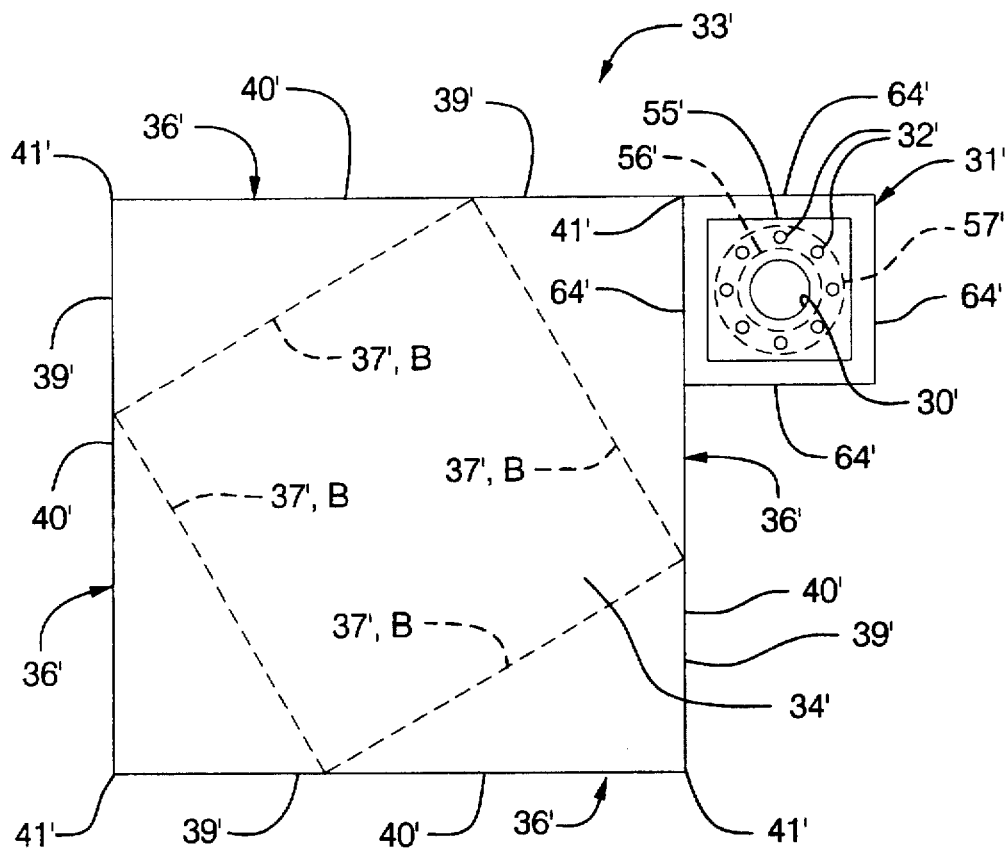
FIG. 4 is a view similar to FIG. 2, but showing an alternate embodiment of the invention.

It will be understood that a person skilled in the art may make modifications to the preferred embodiment shown herein within the scope and intent of the claims. For example, FIG. 4 shows an alternate embodiment of the invention with similar features denoted by similar numerals. The sheet 33' is a more perfect quadrangular shape and includes a central portion 34' and four corner portions 36' extending from the central portion 34'. The corner portions 36' each include fold edges 37' having corresponding fold lines B. The corner portions 36' each include first and second free edges 39', 40' which intersect to form a point 41'. A mounting portion 31' for mounting the cushion when assembled to a restraint system is preferably formed from a separate piece of material and includes perimetral outer edges 64'. The mounting portion 31' is preferably joined to the sheet 33' prior to folding the sheet 33' for cushion construction. Preferably, an outer edge 64' of the mounting portion 31' is suitably joined to one of the second free edges 40' of one of the corner portions 36'. It will be appreciated that the mounting portion 31' could be joined to any of the corner portions 36' such that orientation of the sheet 33' is not critical during attachment. The sheet 33' and the joined mounting portion 31' are then folded to form a cushion similar to that shown in FIG. 3. The cushion formed by the sheet 33' in FIG. 4 is assembled and operates similar to the cushion 22 shown in FIGS. 2 and 3, as described below.

Referring to FIGS. 2 and 3, the cushion 22 is preferably assembled as follows. The sheet 33 is provided having the central portion 34 and four corner portions 36. Prior to folding the sheet 33, the mounting portion 31 is provided on the sheet 33. The mounting portion 31 is preferably attached to one of the free edges 39, 40 of the corner portions 36 on the sheet 33 either by having an outer edge 64 being integrally formed with the second free edge 40 of the corner portion 36 as shown in FIG. 2 or by having an outer edge 64' joined to the free edge 40' of the corner portion 36' by sewing or other bonding as shown in FIG. 4. Advantageously, the mounting portion 31, 31' is provided prior to constructing the cushion 22. Next, the cushion opening 30, 30' is easily provided in the mounting portion 31, 31' which is easily accessible since the sheet 33, 33' is unfolded.

Referring to FIGS. 2 and 4, the next step is to preferably provide a reinforcement patch 55, 55' sized to fit around the cushion opening 30, 30' for strengthening the area around the mounting portion 31, 31' for attachment to the restraint system 20. The reinforcement patch 55, 55' may also preferably be made of a heat resistant material for shielding the cushion 22 from heat generated by the inflator when discharging inflator gas. Preferably, the reinforcement patch 55, 55' is connected to the mounting portion 31, 31' by sewing inner and outer seams 56, 56' and 57, 57' respectively. It will be appreciated that the cushion opening 30, 30' could be provided before or after attachment of the reinforcement patch 55, 55'. Referring to FIGS. 2 and 4, the reinforcement patch 55, 55' and overlying mounting portion 31, 31' are provided with fastener apertures 32, 32' spaced apart around the cushion opening 30, 30' for receiving fasteners (not shown) therethrough for attachment of the cushion 22 to the restraint system 20. It will be appreciated that more than one reinforcement patch 55, 55' may be provided or that none may be provided. Although the cushion 22 is shown as being attached to the restraint system 20 by a plurality of fasteners, it will further be appreciated that other methods may also be used to attach the cushion 22 to the restraint system 20.

The remainder of the description will be made with reference to the preferred embodiment shown in FIGS. 2 and 3, but would be similar for the embodiment of FIG. 4. Next, each of the corner portions 36 of the sheet 33 are folded along the fold lines A corresponding to the fold edges 37 such that the corner portions 36 are in overlying relationship to the central portion 34 of the sheet 33. In addition, the folded corner portions 36 each have free edges 39, 40 which mate with corresponding free edges 39, 40 of the other corner portions 36. In addition, the second free edges 40 of the corner portions 36 mate with corresponding outer edges 64 of the mounting portion 31. Next, the corresponding mating edges of the free edges 39, 40 of the corner portions 36 and the outer edges 64 of the mounting portion 31 are suitably joined to each other such as by sewing or other bonding methods to provide cushion seams 50 as shown in FIG. 3.

Once the corresponding mating edges 39, 40, 64 are joined, the cushion 22 is formed as a generally closed volume except for the cushion opening 30. As best shown in FIG. 3, it will be appreciated that the corner portions 36 and the mounting portion 31 cooperatively provide the forward wall 23 of the cushion 22 which faces away from the occupant 14 during inflation. Thus, only the smooth rearward wall 24 formed by the central portion 34 is presented to the occupant 14 during inflation. It will be appreciated that the edges 39, 40, 64 may be joined while the cushion 22 is inside out and then the cushion 22 may be turned right side out through the cushion opening 30 as a final step during the construction such that the seams 50 are preferably on the inside of the cushion 22. The cushion 22 is shown in its fully assembled condition in FIG. 3.

Advantageously in the assembled condition shown in FIG. 3, it will be appreciated that the free edges 39, 40 of the corner portions 36 are spaced apart from the cushion opening 30 and the fastener apertures 32 and that the mating outer edges 64 of the mounting portion 31 are also spaced apart from the cushion opening 30 and the fastener apertures 32. Thus, there are no edges 39, 40, 64 of the sheet 33 which extend across the mounting portion 31 or which intersect the cushion opening 30 or the fastener apertures 32. Advantageously, the structure of the cushion 22 allows the mounting portion 31 to preferably be a smooth layer of material surrounding the cushion opening 30. Advantageously, there are no seams 50 which are directly adjacent the cushion opening 30 and the inflator during inflation. Also advantageously, the mounting portion 31 presents a smooth, even surface for attachment to the restraint system 20. In addition, there are no bunched together overlapping layers of material disrupting the mounting portion 31, the cushion opening 30 or the fastener apertures 32 which result from the cushion 22 construction, as in the prior art.

After assembly of the cushion 22, the cushion 22 is suitably attached to the restraint system 20, such as by the use of fasteners through fastener apertures 32. Upon sensing predetermined vehicle conditions, the inflator generates gas which is received through the cushion opening 30 and the cushion 22 is inflated as shown in FIG. 1. It will be appreciated that the cushion 22 presents a smooth rearward wall 24 to the occupant 14 since all of the joined edges 39, 40, 64 forming seams 50 are located on the forward wall 23 facing away from the occupant 14.

Figure 5:
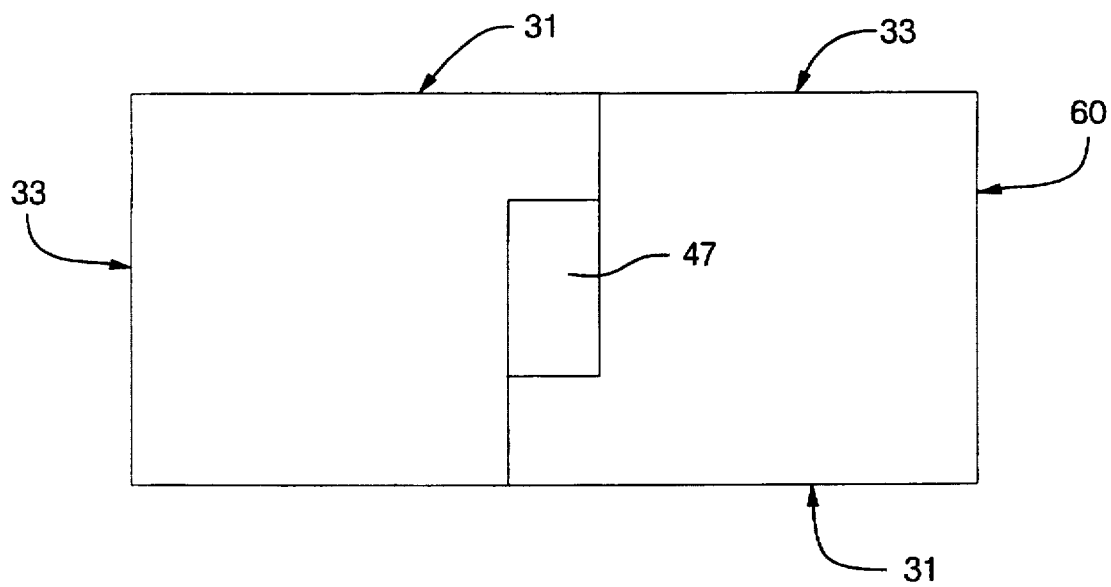
FIG. 5 is a schematic view of the material for forming the sheets to form the cushions according to the present invention and one possible layout of the sheets thereon.

Advantageously, the cushion 22 may efficiently utilize material in manufacturing since the entire cushion 22 is mainly formed from a single generally quadrangular sheet 33 which enables efficient utilization of material as compared to round or other odd-shaped cushions of the prior art formed from one or more panels of material. It will be appreciated that the sheets 33 may be made from a long strip 60 of material with the sheets 33 nested as shown schematically in FIG. 5 with the nested mounting portions 31 sharing the same lateral section of material. It will further be appreciated that the scrap material indicated at 47 may be used to form the reinforcement portions 55 on the mounting portion 31 either by separately stamping or cutting to shape for placement around the cushion opening 30 or by simply folding over the scrap material to provide a double layer of material at the mounting portion 31 prior to providing the cushion opening 30 in the mounting portion 31. Referring to FIG. 4, alternately, the sheets 33' may be formed as more perfect quadrangular shapes and the mounting portion 31' may be formed separately and joined to one of the corner portions 36' for alternate material utilization. In either case, it will be appreciated that the utilization of material for forming the cushion 22 is more efficient than that of round or other odd-shaped cushions. It will further be appreciated that these arrangements of utilizing material to form the sheets 33 are exemplary only and the cushions 22 are in no way limited to these arrangements.

Advantageously, the positioning of the joined edges 39, 40, 64 providing seams 50 produces lower stresses on the joined edges 39, 40, 64 during cushion inflation than typical round cushions of the prior art, thus enabling lighter materials to be used to make the cushion 22. When lighter materials are used, the cushion 22 may be more lightweight and folded to a more compact shape than round cushions of the prior art. While the present cushion 22 is preferably formed with fabric material, the cushion 22 may also be constructed of any other flexible material having a low porosity for retaining inflator gas.

While the present embodiment has been described as carried out in a specific embodiment thereof, it is not intended to be limited thereby, but is intended to cover the invention broadly within the scope and spirit of the claims.

What is claimed is:

1. A restraint cushion for receiving inflator gas discharged from an inflator, the restraint cushion comprising:

a generally quadrangular sheet of material having a central portion and four corner portions extending from the central portion, each corner portion having a fold line adjacent the central portion and each corner portion having two free edges extending from the fold line and intersecting each other to form a point;

a mounting portion extending from one of the corner portions, the mounting portion having a cushion opening therein for receiving inflator gas therethrough to inflate the cushion, the mounting portion having outer edges being spaced apart from the cushion opening; and the corner portions being folded about the fold lines in overlying relationship to the central portion and in mating relationship to corresponding outer edges of the mounting portion, each of the corner portions having one of the free edges joined to one of the outer edges of the mounting portion and each of the free edges being spaced apart from the cushion opening.

2. The restraint cushion of claim 1 wherein the sheet is generally in the shape of a square and wherein the central portion is generally in the shape of a square and wherein the corner portions are generally triangular.

3. The restraint cushion of claim 2 wherein the generally triangular corner portions are defined by first, second, and third angles and wherein one of the angles is a right angle and wherein the other two of the angles are unequal to each other.

4. The restraint cushion of claim 2 wherein the generally triangular corner portions are defined by first, second, and third angles and wherein the first angle is about 90 degrees and wherein the second angle is about 60 degrees and wherein the third angle is about 30 degrees.

5. The restraint cushion of claim 1 wherein each of the corner portions is generally triangular and wherein each of the corner portions is defined by first, second and third angles and wherein one of the angles is a right angle and wherein the other two of the angles are unequal to each other.

6. The restraint cushion of claim 1 wherein each of the corner portions is generally triangular and wherein each of the corner portions is defined by first, second, and third angles and wherein the first angle is about 90 degrees and wherein the second angle is about 60 degrees and wherein the third angle is about 30 degrees.

7. The restraint cushion of claim 1 wherein each of the corner portions has an asymmetrical shape.

8. The restraint cushion of claim 1 wherein the mounting portion is integrally formed with and extends from one of the free edges of one of the corner portions.

9. The restraint cushion of claim 1 wherein the mounting portion is attached to one of the free edges on one of the corner portions.

10. The restraint cushion of claim 1 wherein the sheet is a single integral sheet of material.

11. The restraint cushion of claim 10 wherein the mounting portion is integrally formed with the single integral sheet of material.

12. A method of making a generally quadrangular restraint cushion comprising the steps of:

a. providing a generally quadrangular sheet of material having a central portion and four corner portions extending from the central portion, each corner portion having a fold line adjacent the central portion and each corner portion having two free edges extending from the fold line and intersecting each other to form a point;

b. providing a mounting portion attached to one of the corner portions prior to folding the corner portions;

c. folding the corner portions about the fold lines in overlying relationship to the central portion and in mating relationship to the mounting portion; and d. joining one of the free edges of each corner portion to the mounting portion.

13. The method of claim 12 further including the step of providing a cushion opening in the mounting portion prior to folding the corner portions.

14. The method of claim 13 further including the step of placing the free edges in spaced relation to the cushion opening upon folding the corner portions.

15. The method of claim 12 further including the step of attaching a reinforcement portion to the mounting portion prior to folding the corner portions.

* * * * *